United States Patent [19]

Cudini

[11] Patent Number: 4,567,743

[45] Date of Patent: Feb. 4, 1986

[54] METHOD OF FORMING BOX-SECTION FRAME MEMBERS

[75] Inventor: Ivano G. Cudini, Woodstock, Canada

[73] Assignee: Standard Tube Canada Inc., Woodstock, Canada

[21] Appl. No.: 713,750

[22] Filed: Mar. 19, 1985

[51] Int. Cl.⁴ ............................................. B21D 22/10
[52] U.S. Cl. ..................................... 72/61; 29/421 R; 72/62
[58] Field of Search .............................. 72/60, 61, 62; 29/421 R

[56] References Cited

U.S. PATENT DOCUMENTS

| | | |
|---|---|---|
| 1,210,629 | 1/1917 | Foster . |
| 3,768,288 | 10/1973 | Jury ........................................ 72/61 |
| 4,125,937 | 11/1978 | Brown et al. ........................ 29/727 |
| 4,238,878 | 12/1980 | Stamm et al. ....................... 29/421 |
| 4,305,269 | 12/1981 | Kimura ................................. 72/58 |

FOREIGN PATENT DOCUMENTS 56-154228 11/1981 Japan .

*Primary Examiner*—Leon Gilden
*Attorney, Agent, or Firm*—Ridout & Maybee

[57] ABSTRACT

A box-like frame member is formed by deforming the sides of a tubular blank inwardly to provide it with concavely recessed portions in areas corresponding to generally opposing flat surfaces of the product. The deformed blank is expanded, under internally applied fluid pressure, within a sectional die which has its die cavity preferably no more than about 5% larger than the circumference of the blank, to avoid weakening, cracking or yielding of the blank through excessive circumferential expansion. The inward deformation of the side walls permits the blank to be confined within the sectional die without sections of the die pinching the blank on closing of the die, allows for substantially uniform expansion of the blank toward the box-like section and permits the intermediate, deformed blank and the final product to be formed with a smoothly continuous cross-sectional profile, avoiding stress concentrations in the forming procedure and in the final product which can impair the mechanical strength of the product. The tubular blank may be bent into a complex configuration, preferably before inward deformation of its side walls.

11 Claims, 6 Drawing Figures

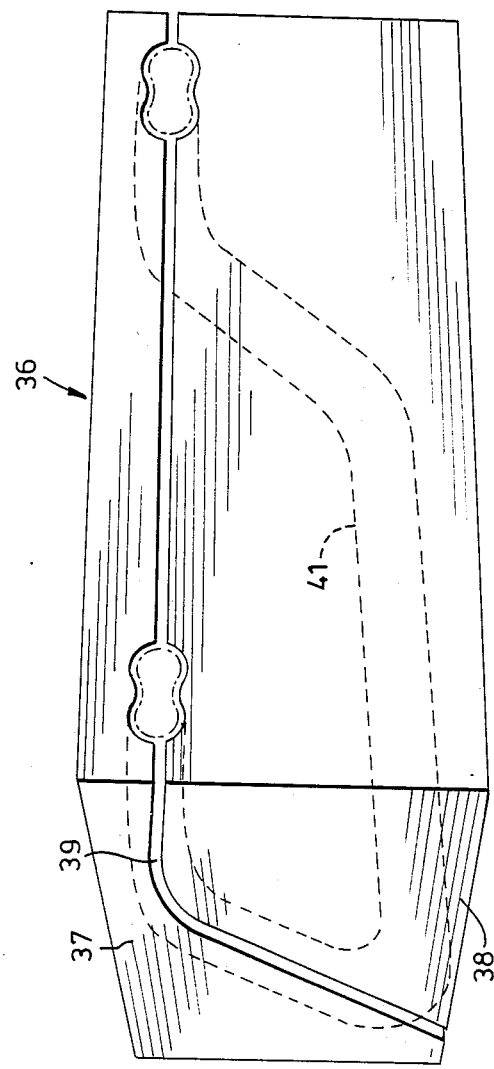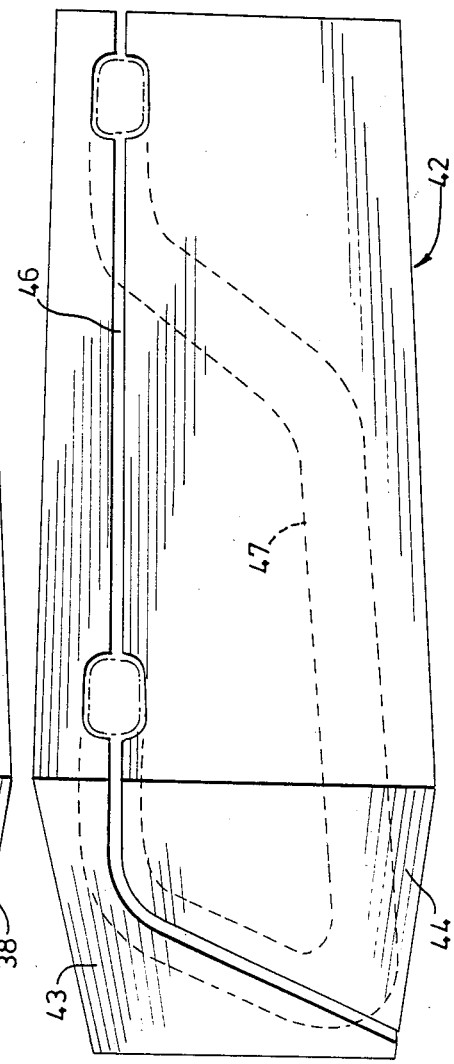

METHOD OF FORMING BOX-SECTION FRAME MEMBERS

The present invention relates to a method of forming box-like frame members.

In the construction of, for example, automobiles and other road vehicles, hollow box-like frame members are frequently required. These frame members usually have one or more pairs of generally flat and opposing side faces. The hollow section imparts lightness in weight while providing good rigidity and other desirable mechanical characteristics. The flat surfaces are convenient for making connections to the frame member, for example by welding, or otherwise fastening thereto, connection elements such as stubs, lugs, brackets and flanges.

Conventionally, such frame members are made by stamping out channel-shaped half shells from sheet metal. The half shells are welded together along edge flanges thereof to provide a box-like configuration. This procedure is relatively time-consuming and expensive since it requires the use of complex progressive dies for stamping out the half shells and requires complex welding equipment, at least where the welding operation is to be performed automatically. Further, the stamping operation produces large amounts of scrap sheet metal. The extensive welding that is required tends to result in the product having imperfections, because of the difficulties of control that are inherent in welding operations. Usually, the welded areas need to be ground down to some extent, and this is time and energy consuming.

The present invention provides a method of forming box-like frame members by expanding a tubular blank circumferentially by application of internal fluid pressure while the blank is confined within a die cavity. This method is much simpler and requires much less complex equipment than the known procedure of welding stamped parts. While procedures for expansion of tubular blanks are known, the prior proposals of which the applicant is aware have been incapable of producing expanded blanks having the strength properties and dimensional uniformity or repeatability and accuracy required for box-like constructional frame members.

In the present method, a tubular blank of smoothly continuous arcuate profile, preferably circular, has its side walls deformed inwardly, to provide a deformed elongate portion of uniform cross-section, at least along the portion or portions of the blank generally corresponding in position to the generally opposed planar faces desired in the product frame member, to provide the blank with concavely curved side wall portions. This permits the blank to be expanded to the desired generally flat-faced cross-section without excessively large circumferential expansion of the blank. Further, since the inward deformation of the side walls diminishes the general cross-sectional outline, or envelope, of the blank, it permits it to be confined between a sectional forming die without the sections of the die pinching the blank on closing of the die. In the inward deformation of the side walls of the blank, and in selection of the cross-sectional profile of the die cavity, care is taken to preserve a smoothly continuous cross-sectional profile. Thus, sharp discontinuities in the cross-sectional profile, which can result in points of mechanical weakness in the product, are avoided. In the expansion step, the tube blank is expanded so that all its outer surfaces conform to the inside of the die cavity, thus reproducing the dimensions of the interior surfaces of the die cavity with a high degree of accuracy and uniformity.

The present invention accordingly provides a method of forming a box-section frame member of which at least an elongate portion is of a uniform cross-section having at least two generally opposed and planar side faces, said method comprising: providing a tubular blank having a continuously smoothly arcuate cross-section; deforming the side walls of the blank inwardly in opposed areas of an elongate portion thereof generally corresponding in position to the planar side faces desired in the final frame member and thereby providing the blank with a continuously smoothly arcuate cross-section including generally opposed inwardly recessed concavely curved side wall portions; enclosing the deformed tubular blank within a sectional die having at least two co-operating die sections defining an elongate cavity of approximately the shape of the deformed blank and which is throughout of smoothly continuous cross-sectional profile and is in all transverse dimensions larger than the deformed blank and has an at least approximately linearly profiled portion adjacent and parallel to each concavely curved side wall portion of the blank; expanding the blank circumferentially by application of internal fluid pressure until all exterior surfaces of the blank conform to the surfaces of the die cavity; separating the die sections; and removing the expanded blank from the die.

The present method can produce frame members with excellent strength characteristics, and with excellent dimensional accuracy and uniformity.

Further advantages of the present method will be described in the following description, with reference to the accompanying drawings which illustrate, by way of example only, one form of method in accordance with the invention.

IN THE DRAWINGS

FIGS. 5 and 6 are perspective views showing, somewhat schematically, forming dies for use in the present process.

Figure 1:
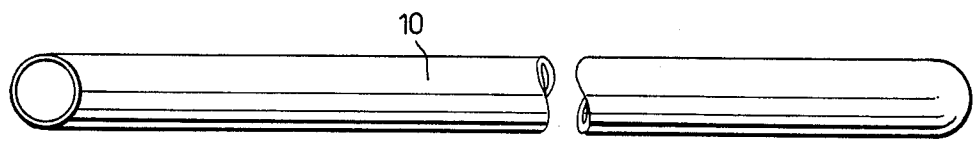
FIGS. 1 to 4 show perspective views of the tubular blank in successive stages of the forming method.
Figure 4:
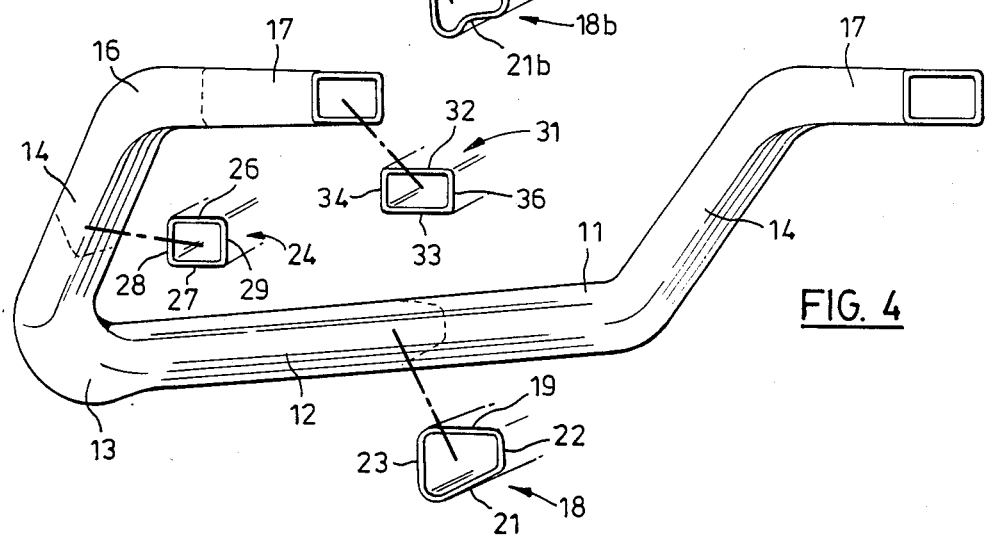

Referring to the drawings, FIG. 1 shows a tubular metal blank 10 which forms the starting material for the method of the invention. FIG. 4 shows the product or frame member 11 which it is desired to form. To some extent, the configuration of the product 11, and the positioning of the flat side surfaces thereon, is dictated by the intended end use of the frame member. For the purposes of the present invention, however, it is desirable that the shape of the product 11 should be selected so it has substantially the same circumference at all transverse cross-sectional profiles, so that the wall of the blank 10 is not excessively thinned and weakened at any point, and thus avoiding introducing into the finished product any point of mechanical weakness. Some non-uniformity in the cross sectional circumference, and hence in the thickness of the wall of the product frame member may, however, be tolerated, depending on the end use to which the frame member is to be put. Desirably, however, the largest circumference of any cross-sectional profile of the finished frame member will be no more than about 20% larger than the smallest circumference, and, more preferably, is no more than about 5% larger.

Desirably also, the circumference of the product frame member 11 is at no point more than about 5% larger than the circumference of the blank 10. Applicant has found that, at least with the readily available grades of tubular steel, if the blank is expanded in circumference by more than about 5%, there is a tendency for the material of the wall of the blank to excessively weaken, to crack, or to yield. While expansions of the tube circumference of up to about 20% can be performed if the metal of the tube is fully annealed, it is preferred to conduct the method without employing special pre-treatments of the material of the blank, such as annealing. In the preferred form, in order to impart to the blank desired cross sectional profiles without introducing points of weakness, or cracking the wall of the tube, the product frame member 11 has, at all cross-sections, a profile with a circumference which is uniform, and is in the range about 2 to about 4% larger than the circumference of the blank 10.

As seen in the drawings, the desired product frame, which, in the example shown is a car sub-frame, is symmetrical about a transverse median plane, and has a linear intermediate section 12, connected at each end through a curved transition or elbow 13 to an end portion 14, which inclines at an oblique angle to the intermediate portion 12. Each end portion 14 extends at the same angle of, e.g. about 135°, outwardly from the axis of the intermediate portion 12, and thus the portions 12 and 14 define at first plane. Each end portion 14 is connected through a further curved transition or elbow 16 to an outer end portion 17. Each outer end portion 17 extends in the same plane at an angle to the plane defined by the portions 12 and 14. Each outer end portion 17 may extend generally parallel to the transverse median plane of the sub-frame, or at a slight angle outwardly with respect thereto.

As seen in FIG. 4, the desired sub-frame has varying non-circular cross-sectional profiles. The applicant has found that, in order to avoid structural weaknesses in the product, it is desirable to select the design of the product so that at all transverse cross-sections, the profile is smoothly continuous, and does not include sharp angularities or discontinuities which can give rise to concentrations of stress and can lead to structural weaknesses. Thus, for example, in the sub-frame shown in FIG. 4, the intermediate section 12 of the frame has a generally trapezoidal profile 18, with inclining sides 19 and 21, and approximately parallel sides 22 and 23. The sides are joined through gently rounded corner portions, and each of the sides 19 through 23 may themselves be gently convexly curved. Each end portion 14 is of an approximately square cross-section 24 with upper and lower sides 26 and 27 and lateral sides 28 and 29. The outer end portions 17 are each of a generally rectangular configuration 31, with upper and lower sides 32 and 33, and lateral sides 34 and 36. As with the cross-sectional profile 18, the profiles 24 and 31 are wholly smoothly continuous, with rounded corner sections joining the approximately linear sides 26 through 29 and 32 through 36. These sides may be gently outwardly convexly curved. The transition section 13 between the generally trapezoidal intermediate section 12 and each end portion 14 blends smoothly at each end with the sections 12 and 14, respectively, and, in its mid-point, is approximately circular. The transition section 16 between each end portion 14 and each outer end portion 17 is generally rectangular, and, again, blends smoothly at each end with the sections 14 and 17.

Thus, the transition section 16 tends to taper in height, as the upper and lower side walls 26 and 27 merge toward the reduced height upper and lower side walls 32 and 33 of the outer end portions 17, while the sides of the transition section 16 tend to flare outwardly from the end portion 14 toward the outer end portion 17.

Figure 2:
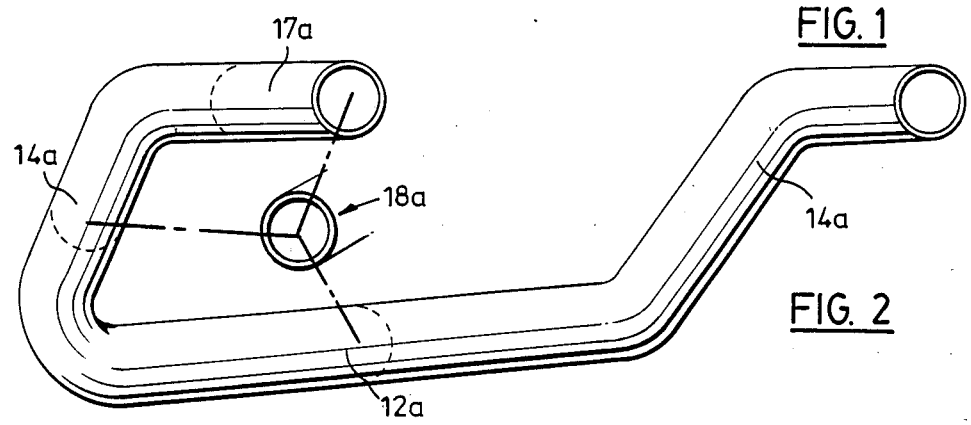

In the method of forming the sub-frame member, the blank 10 is first bent into approximately the configuration of the desired product frame member, to provide it with an intermediate section 12a, outwardly bent end portions 14a, and outer end portions 17a. As shown, the blank 10 is bent so that, throughout its length, it preserves its circular cross-section 18a, as indicated in FIG. 2, and without the blank 10 substantially changing its circumference at any cross-section thereof. The bending operation may be performed using conventional bending procedures, for example using internal mandrels and external bending tools, i.e. mandrel bending, or by stretch bending, which employs no internal mandrel. These bending procedures are generally well known among those skilled in the art, and need not be described in detail herein. In mandrel bending, the minimum radius of bend that may be imparted to the tube is approximately twice the diameter of the tube blank 2, and the minimum distance between adjacent bent portions is approximately one tube diameter. With mandrel bending, a cross-sectional area reduction of about 5% is usually achieved. Where stretch bending, employing no mandrel, is employed, the minimum bend radius will be approximately 3 times the diameter of the blank 10, and the minimum distance between adjacent bends will be approximately one-half of the diameter of the blank 10. Usually, a cross-sectional area reduction of about 15% is achieved.

In the case of the sub-frame component illustrated in the accompanying drawings, it is preferable to use mandrel bending, employing an internal mandrel and external bending tools.

Figure 3:
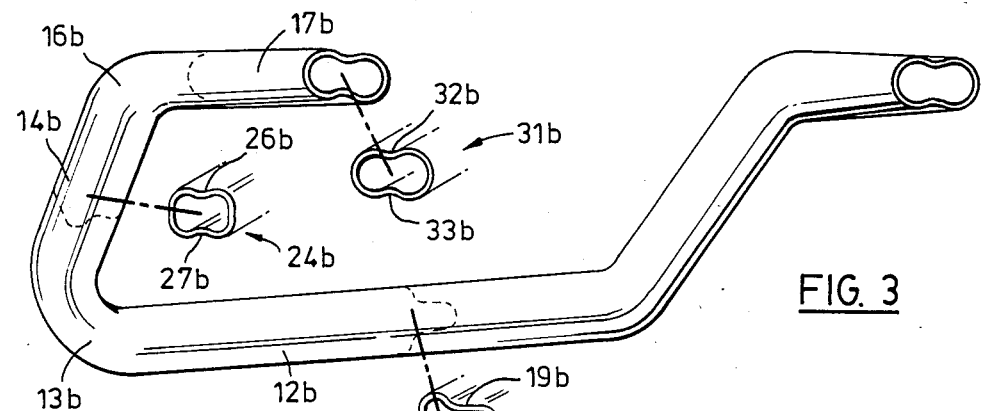

The side walls of the portions 12a, 14a, and 17a are then deformed inwardly, as shown in FIG. 3, to provide these portions with concavely recessed walls in areas which correspond to flat or approximately flat faces in the final product frame member. This procedure has the advantage that it permits the tubular blank to be received without pinching or other sharp angular deformation of the blank, in a sectional die cavity of the desired non-circular cross-sections, and which is no more than about 5% larger in circumference than the blank 10. The inward deformation of the side walls of the bent tubular blank, to provide it with cross-sectional profiles 18b, 24b and 31b shown in FIG. 3, does not substantially change the circumference of the blank at any cross-sectional profile, and thus the circumference of the blank remains substantially the same as that of the original starting material tubular blank 10 at all points.

At the same time, in deforming the side walls of the bent blank inwardly, the inwardly bent profiles, for example the profiles 18b, 24b and 31b are selected so that, at all cross-sections, the blank preserves a smoothly continuous and gently rounded cross-sectional profile. It has been found that this avoids creation of points of stress in the blank during the inward deformation procedure and in the subsequent expansion step, and is thus conducive to forming a product with excellent mechanical strength.

In the example shown, the intermediate section 12b of the bent blank is formed to a uniform cross-section as indicated at 18b in FIG. 3. This has a concavely curved profile 19b and 21b in the regions thereof which correspond to the inclining sides 19 and 21 of the product frame member. Similarly, each end section 14b is formed to a uniform cross-section 24b, which has concavely recessed upper and lower sides 26b and 27b in the regions corresponding to the upper and lower approximately linear profile sides 26 and 27 in the product. The outer end portion 17b of the bent blank is deformed to the profile indicated at 31b in FIG. 3, having upper and lower inwardly arcuately curved sides 32b and 33b.

The transition sections or elbows 13b and 16b, between the intermediate section 12b and the end-sections 14b, and between the section 14b and the outer end portion 17b, respectively, have cross-sectional profiles which vary along their length, and merge smoothly at each end with the adjacent non-circular section profiles 18b, 14b and 17b. The central portion of the transition portion 13b will be of circular cross-section, while the transition section 16b becomes progressively more elongate laterally, and shallower as it extends from the end portion 14b toward the outer end portion 17b.

The inward deformation of the side walls of the bent blank, to provide it with the varying cross-sections illustrated in FIG. 3, can be conducted using conventional and generally well known metal forming techniques. In the preferred form, the operation is conducted by pressing the generally circular section bent blank as shown in FIG. 2 in a two-part sectional die 36, as illustrated in FIG. 5, having upper and lower die halves 37 and 38, respectively, which has a non-planar separation zone 39 conforming to the non-planar configuration of the bent tubular blank as shown in FIG. 2. The die halves are formed along this separation zone with die cavities which, when the halves are brought into opposition, co-operate to form a die cavity having the profile of the deformed blank shown in FIG. 3. In operation, the circular-section tubular blank as shown in FIG. 2 is placed in the cavity of the lower die half 38, and the upper half 37 of the die is brought downwardly toward the lower half 38 until the two portions contact each other and form the shape as shown in FIG. 3.

In expanding the intermediate deformed blank of FIG. 3 to the final form, a two-part sectional die 42 is employed as shown in FIG. 6. This has upper and lower die halves 43 and 44, which have between them a non-planar separation zone 46. On the sides of the die halves 43 and 44 adjacent the zone 46, the die halves 43 and 44 are formed with cavity portions which, when the portions 43 and 44 are brought together, define a cavity 47 conforming to the desired product shown in FIG. 4.

As noted above, in the preferred form, the final product, as shown in FIG. 4 is selected so that, at all cross-sections, its circumference is substantially the same, and is in the range about 2 to about 4% larger than the circumference of the starting material tubular blank 10. It will therefore be appreciated, that the intermediate blank shown in FIG. 3 will fit within an envelope which is smaller than that of the final product shown in FIG. 4.

The deformed intermediate tube blank shown in FIG. 3 can therefore be placed loosely within the cavity portion of the lower half 44 of the final form die, and the upper die section 43 can be placed on top of the lower section 44 to enclose the intermediate blank without pinching the intermediate blank or otherwise deforming it.

The upper and lower die sections 43 and 44 are held together with sufficient force to prevent any movement during the procedure of expansion of the intermediate blank to the final form. Conventional procedures, generally well known in themselves, may be employed to apply internal pressure to the intermediate blank to expand it circumferentially to the final form. Briefly, both ends of the intermediate tubular blank may be sealed, and, through one of these seals, hydraulic fluid is injected at sufficient pressure to expand the blank until all its external surfaces conform to the inner side of the die cavity 47. This procedure produces the varying geometrical cross-sections illustrated to a very high degree of accuracy, uniformity and repeatability.

After the completion of the expansion step, the pressure is released, the hydraulic fluid is pumped out of the interior of the deformed tube, and the upper and lower die sections 43 and 44 are separated and the final product is removed from the die. Any material having sufficient ductility to be processed by the method described above can be employed. In the preferred form, wherein the final product has a substantially uniform circumference, which is no more than about 5% larger than the original circumference of the blank, materials such as mild steel can be employed without any special pretreatment such as annealing. In a typical example, a $3\frac{1}{2}$ inch diameter by 0.080 inch wall thickness by 60 inch long tube of SAE 1010 steel was employed, and was formed and expanded to a product having the configuration shown in FIG. 4, the degree of circumferential expansion being about 3% at all cross-sections of the tube.

Various modifications may be made to the procedure described above. For example, a starting material blank 10 of a smoothly-rounded non-circular cross-section, for example of eliptical cross-section, may be employed.

One further advantage of the above-described procedure, wherein generally opposing side walls of the blank are deformed inwardly before the expansion procedure, is that, during the expansion procedure, the deformed blank tends to expand substantially uniformly outwardly toward the interior surface of the die cavity at all points on its circumference. This avoids rubbing contact between the surfaces of the blank and the die. As a result, there is very little wear of the surfaces of the die, so that excellent repeatability of the process is obtained. Further, the die may be formed from relatively soft and inexpensive materials, without requiring any special surface hardening treatments. In the preferred form, each die cavity in the die 42 (and preferably also in the pre-forming die 36) has its side surfaces disposed at slight draft angles. This avoids any tendency or the intermediate blank or final product to engage within the die cavity, and permits the intermediate blank or final product to be readily removed from the die.

Generally, lubricants do not need to be applied to the surfaces of the intermediate blank or to the surfaces of the dies 36 and 42.

Generally, as in the procedure described above, it is more convenient to bend the blank 10 into conformity with the configuration desired for the final product before deforming the sides of the tubular blank inwardly to provide it with the concavely-recessed areas described above, since this permits bending mandrels and other bending tools which have simply curved surfaces to be employed for engaging and bending the tube blank. It will be appreciated, however, that where special bending tools having surfaces adapted to conform to the complexly-curved surfaces of the deformed blank are employed, the bending operation may be carried out after the side surfaces of the blank have been deformed inwardly.

I claim:

1. Method of forming a box-section frame member of which at least an elongate portion is of a uniform cross section having at least two generally opposed and planar side faces, said method comprising: providing a tubular blank having a continuously smoothly arcuate cross-section; deforming the side walls of the blank inwardly in opposed areas of an elongate portion thereof generally corresponding in position to the planar side faces desired in the final frame member and thereby providing the blank with a continuously smoothly arcuate cross-section including generally opposed inwardly recessed concavely curved side wall portions; enclosing the deformed tubular blank within a sectional die having at least two cooperating die sections defining an elongate cavity of approximately the shape of the deformed blank, and which is throughout of smoothly continuous cross-sectional profile and is in all transverse dimensions larger than the deformed blank and has an at least approximately linearly profiled portion adjacent and parallel to each concavely curved side wall portion of the blank; expanding the blank circumferentially by application of internal fluid pressure until all exterior surfaces of the blank conform to the surfaces of the die cavity; separating the die sections; and removing the expanded blank from the die.

2. Method as claimed in claim 1 wherein the tubular blank is circular and of approximately uniform cross-section.

3. Method as claimed in claim 1 wherein, in the portion of the die cavity enclosing said elongate portion of the deformed blank, the circumference of the cross-sectional profile of the die cavity is no greater than about 5% larger than the circumference of the deformed blank.

4. Method as claimed in claim 3 wherein said circumference of the die cavity is about 2 to 4% larger than the circumference of the blank.

5. Method as claimed in claim 3 wherein at all points along its length, the circumference of the profile of the die cavity is no greater than about 5% larger than the circumference of the deformed blank.

6. Method as claimed in claim 3 wherein the circumference of the profile of the die cavity is substantially the same at all points along its length.

7. Method as claimed in claim 1 wherein the linearly profiled portion of the cavity is approximately trapezoidal with rounded corners, and said deformed blank has said concavely curved side wall portions at the positions corresponding to the inclining sides of the trapezoidal cross-section of the frame member product.

8. Method as claimed in claim 1 wherein the linearly profiled portion of the die cavity is rectangular with rounded corners, and said deformed blank has said concavely curved side wall portions at the positions corresponding to two opposite sides of the rectangular cross-section of the frame member product.

9. Method as claimed in claim 1 including the step of bending the tubular blank into a more complex configuration before expanding it.

10. Method as claimed in claim 9 herein the bending is conducted before deforming the side walls of the blank inwardly.

11. Method of forming a frame member comprising bending each end of a circular section tubular blank outwardly in a common first plane and at an equal oblique angle to one side of the axis of an intermediate portion of the tubular blank; bending an outer end portion of each said end portion so that each extends, approximately parallel to the other, in a second plane inclined to said first plane; deforming opposing portions of the side wall of each end portion and each outer end portion of the blank inwardly to define a smoothly arcuate cross-sectional profile having inwardly recessed concavely curved portions on opposing sides thereof, deforming two circumferentially spaced portions of the side wall of the intermediate portion of the blank inwardly to define a smoothly arcuate generally trapezoidal cross-sectional profile with rounded corners with inwardly recessed concavely curved portions at positions corresponding to the inclining sides of the trapezoid; enclosing the deformed blank within a sectional die having a die cavity of approximately the shape of the deformed blank and which is throughout of a smoothly continuous cross-sectional profile of circumference about 2 to 4% larger than the circumference of the blank and is generally rectangular with rounded corners adjacent the end and outer end portions of the blank and generally trapeoidal with rounded corners adjacent the intermediate portions of the blank; expanding the blank circumferentially by application of internal fluid pressure until all surfaces of the blank conform to the die cavity; separating the die sections; and removing the expanded blank.

* * * * *